(12) United States Patent
Wang et al.

(10) Patent No.: US 9,733,513 B2
(45) Date of Patent: Aug. 15, 2017

(54) TRANSFLECTIVE LIQUID CRYSTAL DISPLAY PANEL COMPRISING A TRANSMISSION AXIS OF A FIRST POLARIZER AND A TRANSMISSION AXIS OF A SECOND POLARIZER FORMING AN ANGLE OF 0 TO 20 DEGREES, MANUFACTURING METHOD THEREOF, AND DISPLAY DEVICE

(71) Applicant: BOE TECHNOLOGY GROUP CO., LTD., Beijing (CN)

(72) Inventors: Xinxing Wang, Beijing (CN); Jaegeon You, Beijing (CN); Jikai Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 40 days.

(21) Appl. No.: 14/429,429

(22) PCT Filed: Aug. 8, 2014

(86) PCT No.: PCT/CN2014/084013
§ 371 (c)(1),
(2) Date: Mar. 19, 2015

(87) PCT Pub. No.: WO2015/109817
PCT Pub. Date: Jul. 30, 2015

(65) Prior Publication Data
US 2016/0041427 A1  Feb. 11, 2016

(30) Foreign Application Priority Data

Jan. 22, 2014 (CN) .......................... 2014 1 0030893

(51) Int. Cl.
*G02F 1/1335* (2006.01)
*G02F 1/1337* (2006.01)

(52) U.S. Cl.
CPC ...... *G02F 1/133555* (2013.01); *G02F 1/1337* (2013.01); *G02F 1/133528* (2013.01);
(Continued)

(58) Field of Classification Search
CPC ......... G02F 1/133555; G02F 1/133371; G02F 1/133514; G02F 1/136227;
(Continued)

(56) References Cited

U.S. PATENT DOCUMENTS 8,120,735 B2   2/2012 Kwok et al.
2007/0046869 A1   3/2007 Lin et al.
(Continued)

FOREIGN PATENT DOCUMENTS

CN    101393502 A    3/2009
CN    101673001 A    3/2010
(Continued)

OTHER PUBLICATIONS

International Search Report Appln. No. PCT/CN2014/084013; Dated Nov. 15, 2014.
(Continued)

*Primary Examiner* — Paul Lee
(74) *Attorney, Agent, or Firm* — Ladas & Parry LLP

(57) ABSTRACT

A transflective liquid crystal display panel, a manufacturing method thereof and a display device are disclosed. The transflective liquid crystal display panel includes: a first substrate (1) and a second substrate (2) disposed oppositely and a liquid crystal layer (3) between the first substrate (1) and the second substrate (2). The first substrate (1) and the second substrate (2) include transmissive areas and reflective areas. Transmissive areas of the first substrate (1) are provided with a first homogenous alignment layer (11), transmissive areas of the second substrate (2) are provided with a second homogenous alignment layer (21), and the
(Continued)

alignment direction of the first homogenous alignment layer (11) and the alignment direction of the second homogenous alignment layer (21) have a predetermined angle. Reflective areas of the first substrate (1) are provided with a third homogenous alignment layer (12) and reflective areas of the second substrate (2) are provided with a homeotropic alignment layer (22). This can realize a transflective liquid crystal display panel with simple structure.

13 Claims, 3 Drawing Sheets

(52) U.S. Cl.
CPC .. *G02F 1/133723* (2013.01); *G02F 1/133753* (2013.01); *G02F 2001/133531* (2013.01); *G02F 2001/133738* (2013.01); *G02F 2001/133742* (2013.01); *G02F 2001/133757* (2013.01)

(58) Field of Classification Search
CPC .............. G02F 1/133553; G02F 1/1337; G02F 1/133711; G02F 1/134363; G02F 1/133788; G02F 1/133753; G02F 2001/133738; G02F 2001/133742
USPC .................................................. 349/114, 113
See application file for complete search history.

(56) References Cited

U.S. PATENT DOCUMENTS

| | | | |
|---|---|---|---|
| 2008/0223628 A1 | 9/2008 | Lyon et al. | |
| 2010/0066702 A1 | 3/2010 | Lee et al. | |
| 2010/0110038 A1 | 5/2010 | Mo et al. | |
| 2010/0110351 A1* | 5/2010 | Kim | G02F 1/133555 349/114 |
| 2011/0285684 A1* | 11/2011 | Lu | G02F 1/133371 345/211 |
| 2014/0300575 A1 | 10/2014 | Chang | |
| 2015/0029454 A1* | 1/2015 | Xie | G02F 1/133784 349/128 |

FOREIGN PATENT DOCUMENTS

| | | | | |
|---|---|---|---|---|
| CN | 102214049 A | | 10/2011 | |
| CN | 202189205 U | | 4/2012 | |
| CN | 102541371 A | | 7/2012 | |
| CN | 102890366 A | | 1/2013 | |
| CN | 102981300 A | | 3/2013 | |
| CN | 103293769 A | * | 9/2013 | ....... G02F 1/133753 |
| CN | 103293770 A | | 9/2013 | |
| CN | 203299800 U | | 11/2013 | |
| CN | 103792721 A | | 5/2014 | |

OTHER PUBLICATIONS

Written Opinion of the International Searching Authority Appln. No. PCT/CN2014/084013; Dated Nov. 2, 2014.
First Chinese Office Action Appln. No. 201410030893.4; Dated Feb. 28, 2015.
First Chinese Office Action Appln. No. 201310263938.8; Dated Aug. 5, 2015.
Second Chinese Office Action Appln. No. 20140030893.4; Dated Aug. 4, 2015.
Third Chinese Office Action Appln. No. 201410030893.4; Dated Dec. 29, 2015.

* cited by examiner

TRANSFLECTIVE LIQUID CRYSTAL DISPLAY PANEL COMPRISING A TRANSMISSION AXIS OF A FIRST POLARIZER AND A TRANSMISSION AXIS OF A SECOND POLARIZER FORMING AN ANGLE OF 0 TO 20 DEGREES, MANUFACTURING METHOD THEREOF, AND DISPLAY DEVICE

TECHNICAL FIELD

Embodiments of the present invention relate to a transflective liquid crystal display panel and a manufacturing method thereof, and a display device.

BACKGROUND

A liquid crystal display panel mainly includes a color filter substrate, an array substrate disposed oppositely and a liquid crystal layer between the color filter substrate and the array substrate; and displays images with illumination by the backlight source or natural light. For different types of light source, liquid crystal display panels are mainly classified into transmissive, reflective and transflective ones.

A transmissive liquid crystal display panel mainly uses a backlight source as the light source, that is, a backlight source is provided behind the liquid crystal display panel, transparent electrodes are used for pixel electrodes on its array substrate and function as transmissive areas, which is advantageous for light of backlight source to transmit the liquid crystal layer to display images. A reflective liquid crystal display panel mainly uses a front light source or an external light source as its light source, and reflective electrodes of metals or other materials with good reflection characteristics are used on the array substrate as reflective areas, which is advantageous for reflecting light of front light source or external light source. A transflective liquid crystal display panel may be considered as a combination of a transmissive and a reflective liquid crystal display panel with both reflective areas and transmissive areas provided on the array substrate, which can use both the backlight source and the external light source for displaying.

Transmissive liquid crystal display panels have an advantage of capability to display bright images in dark circumstance and a disadvantage of small proportion of light that can transmit to the light emitted by the backlight source, i.e., a low utilization ratio of backlight source. Thus, in order to enhance display luminance, it is required to enhance luminance of backlight source drastically, which thereby causes high energy consumption. Reflective liquid crystal display panels have advantages of utilizing external light sources such as sunlight and relatively low power consumption, and disadvantages of incapability of displaying images in the dark due to the dependence on external light source. Transflective liquid crystal display panels have the advantages of both transmissive and reflective liquid crystal display panels and can be used both in dark circumstances such as in a room and in bright circumstance such as outdoor. Therefore, they are widely used as display units of products such as mobile products, e.g., cell phones, digital cameras, palm computers and GPRS.

Transflective liquid crystal display panels include single cell gap (uniform liquid crystal layer thickness for transmissive and reflective areas) and thick cell gap (non-uniform thickness of liquid crystal layer for transmissive and reflective areas) types.

SUMMARY

Embodiments of the present invention provide a transflective liquid crystal display panel, a manufacturing method thereof and a display device to realize a transflective liquid crystal display panel with simple structure.

At least one embodiment of the present invention provides a transflective liquid crystal display panel including: a first substrate and a second substrate disposed oppositely and a liquid crystal layer between the first substrate and the second substrate. The first substrate and the second substrate include transmissive areas and reflective areas. Transmissive areas of the first substrate are provided with a first homogenous alignment layer, transmissive areas of the second substrate are provided with a second homogenous alignment layer, and the alignment direction of the first homogenous alignment layer and the alignment direction of the second homogenous alignment layer have a predetermined angle. Reflective areas of the first substrate are provided with a third homogenous alignment layer and reflective areas of the second substrate are provided with a homeotropic alignment layer.

At least one embodiment of the present invention provides a display device including the above-mentioned transflective liquid crystal display panel.

At least one embodiment of the present invention provides a manufacturing method of a transflective liquid crystal display panel including: forming a first homogenous alignment layer in transmissive areas of a first substrate and forming a third homogenous alignment layer in reflective areas of the first substrate; forming a homeotropic alignment layer in reflective areas of the second substrate disposed oppositely to the first substrate, and forming a second homogenous alignment layer with an alignment direction forming a predetermined angle with the alignment direction of the first homogenous alignment layer in transmissive areas of the second substrate; and providing a liquid crystal layer between the first substrate formed with the first homogenous alignment layer and the third homogenous alignment layer and the second substrate formed with the second homogenous alignment layer and the homeotropic alignment layer.

BRIEF DESCRIPTION OF THE DRAWINGS

In order to explain the technical solution of embodiments of the present invention more clearly, accompanying drawings of the embodiments will be introduced briefly below. Obviously, the accompanying drawings in the following description only relate to some embodiments of the present invention rather than limiting the present invention.

DETAILED DESCRIPTION

Figure 1:
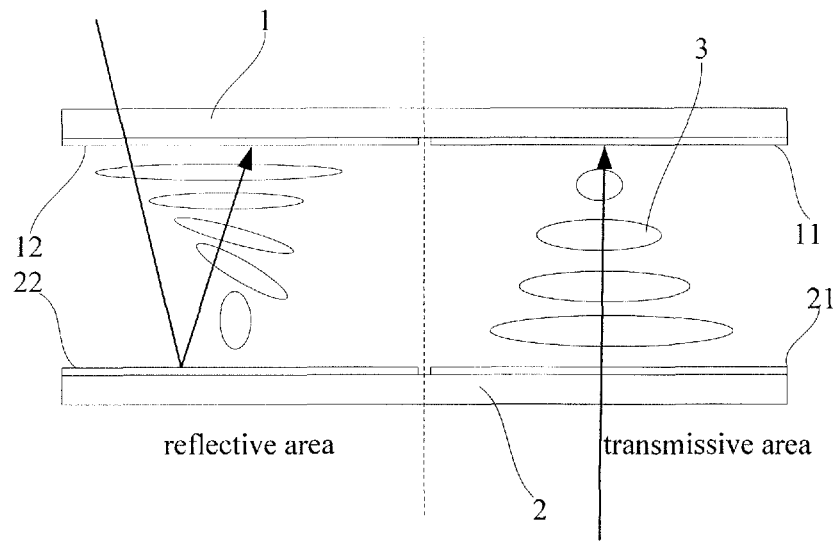
FIG. 1 is a schematic cross sectional view I of a transflective liquid crystal display panel according to an embodiment of the present invention with no voltage applied.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

The inventor of the present application found out that a $\lambda/4$ phase delay sheet is generally provided in the structure of a prior art transflective liquid crystal display panel, which makes the structure of the liquid crystal display panel complex. Therefore, at least one embodiment of the present invention provides a transflective liquid crystal display panel, a manufacturing method thereof and a display device to realize a transflective liquid crystal display panel with simple structure, such as a normally black transflective liquid crystal display panel.

At least one embodiment of the present invention provides a transflective liquid crystal display panel including: a first substrate and a second substrate disposed oppositely and a liquid crystal layer between the first substrate and the second substrate. The first substrate and the second substrate include transmissive areas and reflective areas. Transmissive areas of the first substrate are provided with a first homogenous alignment layer, transmissive areas of the second substrate are provided with a second homogenous alignment layer, and the alignment direction of the first homogenous alignment layer and the alignment direction of the second homogenous alignment layer have a predetermined angle. Reflective areas of the first substrate are provided with a third homogenous alignment layer and reflective areas of the second substrate are provided with a homeotropic alignment layer.

In at least one embodiment of the present invention, twist nematic alignment (namely TN mode alignment) is used for transmissive areas of the transflective liquid crystal display panel and hybrid alignment (namely HAN mode alignment) is used for reflective areas. Transmissive areas are of homogenous alignment with an effect equivalent to a $\lambda/2$ phase delay sheet. The hybrid alignment used for reflective areas has an effect equivalent to a $\lambda/4$ phase delay sheet, causing light from external light source in reflective areas is incident and then reflected to the exiting side of the display device, which is an effect equivalent to a $\lambda/2$ phase delay sheet. Therefore, light in both transmissive areas and reflective areas can exit to the exiting side easily, hence realizing the transflective effect. The transflective liquid crystal display panel displays images without using a $\lambda/4$ phase delay sheet so as to realize a transflective liquid crystal display panel with simple structure. Furthermore, in embodiments of the present invention, polarizer sheets on both sides of the transflective liquid crystal display panel may have parallel transmission axes, which can realize normally black display, and in turn realize a normally black transflective liquid crystal display panel with simple structure.

In the present disclosure, "homogenous alignment" means the initial alignment direction of liquid crystal while no voltage is applied is a horizontal direction, which is parallel to surfaces of the upper and bottom substrates. "Homeotropic alignment" means that the initial alignment direction of liquid crystal while no voltage is applied is a vertical direction, which is perpendicular to surfaces of the upper and bottom substrates. Two corresponding alignment layers may realize hybrid alignment and twist nematic (TN) alignment.

Technical proposals provided in embodiments of the present invention will be described in detail below with reference to accompanying drawings.

FIG. 1 illustrates a transflective liquid crystal display panel provided in an embodiment of the present invention including: a first substrate 1 and a second substrate 2 disposed oppositely and a liquid crystal layer 3 between the first substrate 1 and the second substrate 2. The first substrate 1 and the second substrate 2 include transmissive areas and reflective areas. Transmissive areas of the first substrate 1 are provided with a first homogenous alignment layer 11, transmissive areas of the second substrate 2 are provided with a second homogenous alignment layer 21, and the alignment direction of the first homogenous alignment layer 11 and the alignment direction of the second homogenous alignment layer 21 have a predetermined angle. Reflective areas of the first substrate 1 are provided with a third homogenous alignment layer 12 and reflective areas of the second substrate 2 are provided with a homeotropic alignment layer 22.

Figure 2:
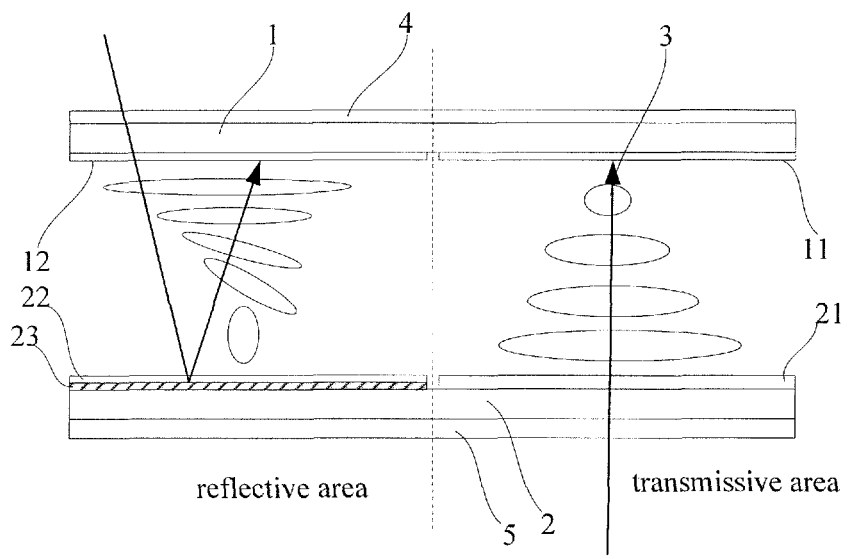
FIG. 2 is a schematic cross sectional view II of a transflective liquid crystal display panel according to an embodiment of the present invention with no voltage applied.

In one example, referring to FIG. 2, the transflective liquid crystal display panel illustrated in FIG. 1 may further include: a first polarizer sheet 4 on the first substrate 1 on the side apart from the liquid crystal layer 3, and a second polarizer sheet 5 on the second substrate 2 on the side apart from the liquid crystal layer 3.

When the transmission axis of the first polarizer sheet 4 and the transmission axis of the second polarizer sheet 5 have a small angle, the liquid crystal display panel can realize normally black display with good effect. For example, the transmission axis of the first polarizer sheet 4 and the transmission axis of the second polarizer sheet 5 have an angle of 0°~20°, and the normally black display has good effect.

In one example, the transmission axis of the first polarizer sheet 4 and the transmission axis of the second polarizer sheet 5 are parallel, that is, the transmission axis of the first polarizer sheet 4 and the transmission axis of the second polarizer sheet 5 form an angle of 0°. Here, the normally black display effect of the liquid crystal display panel is the best.

In one example, referring to FIG. 2, the transflective liquid crystal display panel illustrated in FIG. 1 further includes a reflective layer 23 in reflective areas on the second substrate 2 which is on a side of the homeotropic alignment layer 22 opposite to the liquid crystal layer 3.

In order to avoid light leakage at an interface between transmissive areas and reflective areas, in one example, the homeotropic alignment layer 22 over the reflective layer 23 is on the same horizontal plane as the upper surface of the second homogenous alignment layer 21 disposed on transmissive areas of the second substrate 2. In a specific implementation, upper surfaces of the homeotropic alignment layer 22 and the second homogenous alignment layer 21 are flat and are made on the same horizontal plane, which can also ensure the transflective liquid crystal display panel provided in the embodiment of the present invention is of a single cell gap mode. Of course, the transflective liquid crystal display panel illustrated in FIG. 1 is not limited to the single cell gap mode, but also may be the thick cell gap mode.

In reflective areas, light from the external light source incident in reflective areas pass through the liquid crystal layer first, then is reflected to the exiting side of the display device via the liquid crystal layer again under the reflection action of the reflective layer on the second substrate, thereby realizing transflective displaying with better effect.

The principle of realizing normally black transflective effect by the transflective liquid crystal display panel will be described in detail below.

FIG. 1 is a schematic cross sectional view of the transflective liquid crystal display panel with no voltage applied. In FIG. 1, areas on two sides of the broken line are transmissive areas and reflective areas respectively with the arrow headed folding line representing light.

Figure 3:
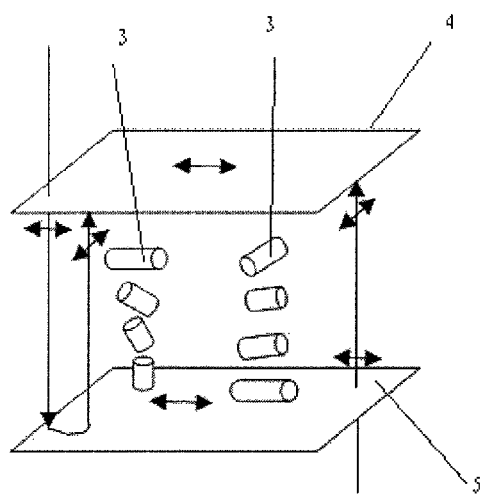
FIG. 3 is a schematic perspective diagram of a transflective liquid crystal display panel according to an embodiment of the present invention with no voltage applied.

FIG. 3 is a schematic perspective diagram of the transflective liquid crystal display panel with no voltage applied. In FIG. 3, the double arrow headed line segment is the polarization direction of light. FIG. 3 only illustrates the first polarizer sheet 4 and the second polarizer sheet 5 and alignment state of liquid crystal molecules in the liquid crystal layer 3 in transmissive areas and reflective areas.

In the embodiment of the present invention, transmission axes of the first polarizer sheet 4 and the second polarizer sheet 5 are parallel. When light passes the first polarizer sheet or the second polarizer sheet and then changes in phase through the liquid crystal layer 3, it is impossible to transmit the first polarizer sheet 4 or the second polarizer sheet 5 and the liquid crystal display panel appears dark.

Referring to FIGS. 1 and 3, in the embodiment of the present invention, the third homogenous alignment layer 12 and the homeotropic alignment layer 22 in reflective areas are of hybrid alignment with an effect equivalent to a $\lambda/4$ phase delay sheet. Light reflected from external passes through the liquid crystal layer equivalent to the $\lambda/4$ phase delay sheet for twice and with phase changed by 90° and cannot pass through the first polarizer sheet 4 to exit, hence the reflective areas appear dark.

In the embodiment of the present invention, alignment directions of the first homogenous alignment layer 11 and the second homogenous alignment layer 21 in transmissive areas form a predetermined angle, that is, the alignment mode of transmissive areas is a twist alignment. Light from the backlight source passes the second polarizer sheet 5, then passes the liquid crystal layer 3 of transmissive areas, and changes its phase. Most or all light is reflected back and cannot pass the first polarizer sheet 4. Therefore, transmissive areas appear dark. The magnitude of phase change corresponds to the alignment direction angle between the first homogenous alignment layer 11 and the second homogenous alignment layer 21. For example, when the alignment direction angle between the first homogenous alignment layer 11 and the second homogenous alignment layer 21 is 90°, light phase changes by 90° after passing the liquid crystal layer 3 in transmissive areas, and no light can pass the first polarizer sheet 4.

Figure 4:
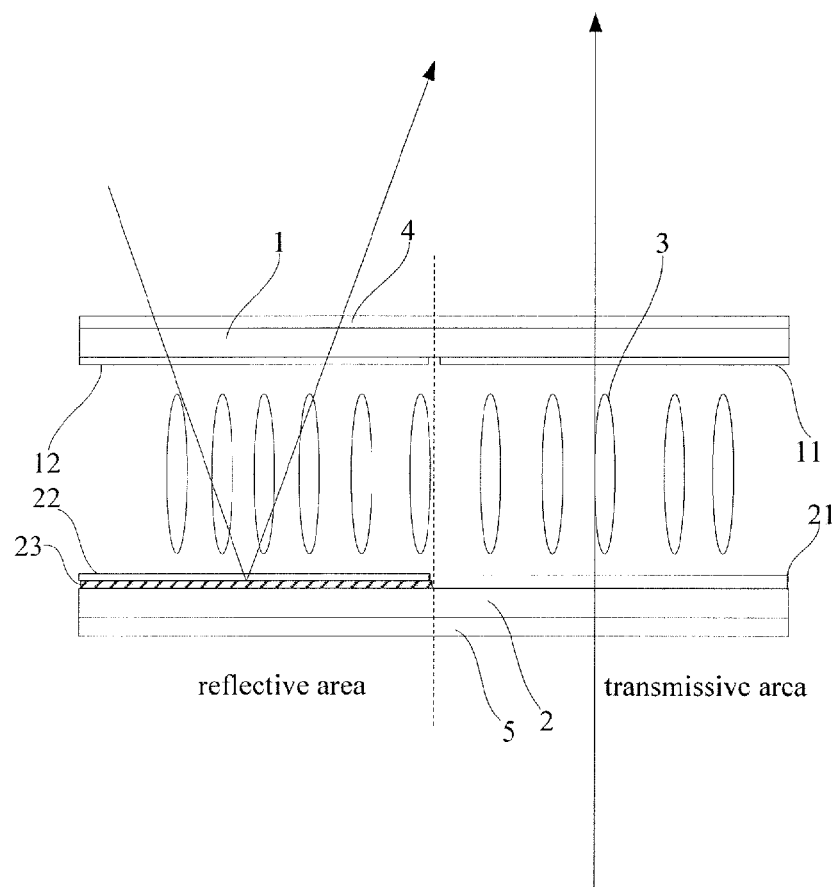
FIG. 4 is a schematic cross sectional view of a transflective liquid crystal display panel according to an embodiment of the present invention with a voltage applied.
Figure 5:
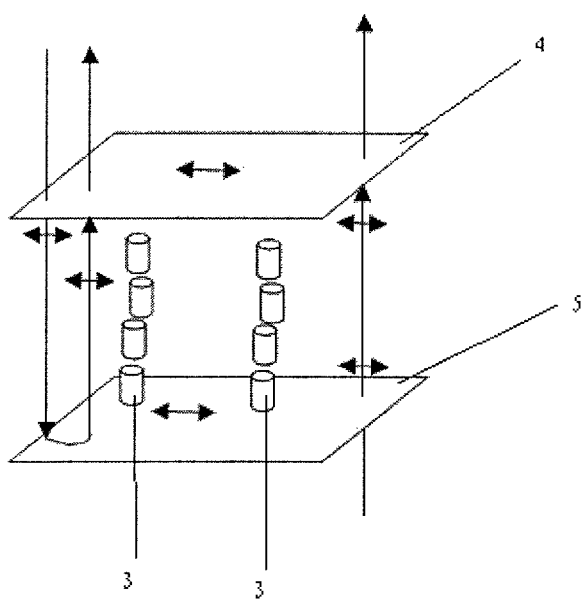
FIG. 5 is a schematic perspective diagram of a transflective liquid crystal display panel according to an embodiment of the present invention with a voltage applied.

When the transflective liquid crystal display panel illustrated in FIG. 1 is applied with a voltage, FIGS. 4 and 5 are referred to. FIG. 5 is a schematic perspective diagram of the transflective liquid crystal display panel with a voltage applied. In FIG. 5, the double arrow headed line segment is the polarization direction of light. FIG. 5 only illustrates the first polarizer sheet 4 and the second polarizer sheet 5 and alignment state of liquid crystal molecules in the liquid crystal layer 3 in transmissive areas and reflective areas.

Referring to FIGS. 4 and 5, liquid crystal molecules in the liquid crystal layer 3 are aligned perpendicularly to the first substrate 1 and the second substrate 2, the liquid crystal layer 3 does not change the light's phase, light from the backlight source in transmissive areas and light from external light source in reflective areas pass the liquid crystal layer to exit to the exiting side easily, hence the liquid crystal display panel appearing bright.

Although other structures of normally black transflective liquid crystal display panel exist, for example, vertical alignment (VA mode) for transmissive areas and hybrid alignment for reflective areas, however phase difference sheets (usually a $\lambda/4$ phase delay sheets) need to be provided on both sides of the liquid crystal display panel. Provision of the phase difference sheets will increase thickness of the liquid crystal display panel, causing the structure of liquid crystal display panel complex and can also reduce light transmission rate of the liquid crystal display panel and lower display quality of images. Furthermore, the process step of attaching phase difference sheets on the liquid crystal display panel is complex.

In embodiments of the present invention, the transflective liquid crystal display panel describe above illustrated in FIG. 1 can realize a normally black transflective liquid crystal display panel. Since the normally black mode can drastically reduce energy consumption of the transflective liquid crystal display panel, the problem of large energy consumption with normally white mode is addressed. The transflective liquid crystal display panel provided in embodiments of the present invention can realize better image display effect under the action of external sunlight in case of sufficient outdoors sunlight. Also, the transflective liquid crystal display panel provided in embodiments of the present invention doesn't need the $\lambda/4$ phase delay sheet, thereby avoiding problems with transflective liquid crystal display panel caused by the phase delay sheet such as thick structure, low light transmission ratio and complex manufacturing process.

In one example, in order to further simplify the structure of the transflective liquid crystal display panel and avoid light leakage caused by non-uniform orientation of transmissive areas and reflective areas, the thickness of liquid crystal layer 3 in transmissive areas and the thickness of liquid crystal layer 3 in reflective areas illustrated in FIG. 1 are set to be equal or nearly equal to the maximum extent to realize a transflective liquid crystal display panel of single cell gap. The transflective liquid crystal display panel of single cell gap has simple structure, thin thickness and can also avoid the problem of complex manufacturing process with thick cell gap transflective liquid crystal display panels. In summary, the transflective liquid crystal display panel of the example has advantages such as low energy consumption, being thin and simple manufacturing process due to single cell gap, and high light transmittance resulted from no phase delay sheet, and overcomes the problem with other transflective liquid crystal display panels being incapable of realizing the above-mentioned advantages at the same time.

In embodiments of the present invention, when alignment direction angle between the first homogenous alignment layer 11 and the second homogenous alignment layer 21 is large, dark effect of transmissive areas of the transflective liquid crystal display panel with no voltage applied is better.

For example, when alignment direction angle between the first homogenous alignment layer 11 and the second homogenous alignment layer 21 is within the range of 70°~90°, the dark effect of the liquid crystal display panel is better. However it is not limited to the range, any angle that can realize dark state of transmissive areas with no voltage applied is within the scope of the present invention. That is, liquid crystal molecules in transmissive areas appearing any twist nematic distribution are all within the scope of embodiments of the present invention.

In one example, when the alignment direction angle between the first homogenous alignment layer 11 and the second homogenous alignment layer 21 is 90°, light in transmissive areas with no voltage applied is all reflected back, and the display appears the darkest state with the best dark state effect.

In order to further enhance normally black display effect in embodiments of the present invention and prevent light leakage from occurring, referring to FIG. 1, the alignment direction of the third homogenous alignment layer 12 and the alignment direction of the first homogenous alignment layer 11 are in the same plane and perpendicular to each other, that is, alignment directions of the second homogenous alignment layer 21 and the third homogenous alignment layer 12 are parallel, and the transmission axes of the first polarizer sheet 4 and the second polarizer sheet 5 are parallel. When the transflective liquid crystal display panel is not applied with a voltage, when light in transmissive areas and light in reflective areas passes the transflective liquid crystal display panel, the light is completely blocked, and transmissive areas and reflective areas appear completely dark.

In one example, polyimide is used for the above-mentioned first homogenous alignment layer, the second homogenous alignment layer, the third homogenous alignment layer and the homeotropic alignment layer provided in embodiments of the present invention. In one example, embodiments of the present invention implement the first homogenous alignment layer, the second homogenous alignment layer, the third homogenous alignment layer and the homeotropic alignment layer by means of the light alignment technology of clean mode. The alignment layer manufactured by light alignment technology is clean and the manufacturing process is simple, which can not only avoid disadvantages resulted by rubbing orientation and simplify the manufacturing process flow.

In one example, one of the first substrate and the second substrate provided in embodiments of the present invention is color filter substrate, the other is array substrate. In another example, common electrodes are disposed on the color filter substrate provided in embodiments of the present invention and pixel electrodes are provided on the array substrate. It is to be noted that common electrodes and pixel electrodes are not specifically illustrated in accompanying drawings.

The manufacturing method of the transflective liquid crystal display panel provided in embodiments of the present invention will be described in detail below, including the following steps:

Step 1: a first homogenous alignment layer is formed in transmissive areas of the first substrate and a third homogenous alignment layer is formed in reflective areas of the first substrate. The order of forming the first homogenous alignment layer and the third homogenous alignment layer is not limited.

Step 2: a homeotropic alignment layer is formed in reflective areas of the second substrate disposed oppositely to the first substrate, and a second homogenous alignment layer with alignment direction forming a predetermined angle with the alignment direction of the first homogenous alignment layer in transmissive areas of the second substrate. The order of forming the second homogenous alignment layer and the homeotropic alignment layer is not limited.

Step 3: forming a liquid crystal layer between the first substrate formed with the first homogenous alignment layer and the third homogenous alignment layer and the second substrate formed with the second homogenous alignment layer and the homeotropic alignment layer.

The order for step 1 and step 2 may be interchanged.

In one example, before forming the homeotropic alignment layer on the second substrate, the method further includes step 4: forming a reflective layer covering the reflective areas on the second substrate on a side close to the first substrate.

In one example, after forming the liquid crystal layer, the method further includes step 5: forming a first polarizer sheet on a side of the first substrate apart from the liquid crystal layer and forming a second polarizer sheet with a transmission axis forming a angle of 0°~20° with the transmission axis of the first polarizer sheet on a side of the second substrate apart from the liquid crystal layer. For example, a second polarizer sheet with a transmission axis parallel to that of the first polarizer sheet is formed on a side of the second substrate apart from the liquid crystal layer.

Forming a first homogenous alignment layer in transmissive areas of the first substrate and forming a third homogenous alignment layer in reflective areas of the first substrate described in step 1 is for example: coating a layer of light polymerizable homogenous alignment solution on the first substrate, for example, ultraviolet exposing the light polymerizable homogenous alignment solution corresponding to reflective areas by masking light polymerizable homogenous alignment solution corresponding to the transmissive areas by a mask to form the third homogenous alignment layer; and masking the third homogenous alignment layer formed in the reflective areas by a mask for, e.g., ultraviolet exposing the light polymerizable homogenous alignment solution corresponding to the transmissive areas to form the first homogenous alignment layer. While forming the first homogenous alignment layer, polarization direction of light upon ultraviolet exposure is perpendicular to the alignment direction of the first homogenous alignment layer. While forming the third homogenous alignment layer, polarization direction of light upon ultraviolet exposure is perpendicular to the alignment direction of the third homogenous alignment layer.

In one example, step 1 includes: forming the first homogenous alignment layer in transmissive areas of the first substrate and forming the third homogenous alignment layer with an alignment direction perpendicular to that of the first homogenous alignment layer in reflective areas of the first substrate.

Forming a homeotropic alignment layer in reflective areas of the second substrate disposed oppositely to the first substrate and forming a second homogenous alignment layer with an alignment direction forming a predetermined angle with the alignment direction of the first homogenous alignment layer in transmissive areas of the second substrate described in step 2 is for example: coating a layer of light polymerizable homogenous alignment solution on the second substrate, for example, ultraviolet exposing the light polymerizable homogenous alignment solution to form the second homogenous alignment layer with an alignment direction forming an angle of e.g., 70~90° with the alignment direction of the first homogenous alignment layer; and masking the second homogenous alignment layer formed in the transmissive areas by a mask, forming a layer of light polymerizable homeotropic alignment solution on the second homogenous alignment layer in the reflective areas, and, e.g., ultraviolet exposing the light polymerizable homeotropic alignment solution to form the homeotropic alignment layer.

In one example, after forming the second homogenous alignment layer, the second homogenous alignment layer is subjected to interface treatment with oxygen plasma to improve the interface of the second homogenous alignment layer, allowing alignment of liquid crystal molecules more accurate and avoiding bad phenomena.

Embodiments of the present invention realize the first homogenous alignment layer, the second homogenous alignment layer, the third homogenous alignment layer and the homeotropic alignment layer by the light alignment technology without rubbing step in the whole implementation procedure, which is a clean mode, has no pollution, generates no static electricity and can easily realize alignments area by area.

An embodiment of the present invention further provides a display device including any transflective liquid crystal display panel provided in the above-mentioned embodiments. The display device may be a display device such as a liquid crystal display panel, a liquid crystal TV, a liquid crystal flat computer.

In summary, embodiments of the present invention provide a transflective liquid crystal display panel with twist nematic alignment (namely TN mode alignment) used for transmissive areas and hybrid alignment (namely HAN mode alignment) used for reflective areas. The effect of hybrid alignment used for reflective areas is equivalent to a $\lambda/4$ phase delay sheet, and the effect of homogenous alignment used for transmissive areas is equivalent to a $\lambda/2$ phase delay sheet, therefore the transflective effect can be realized. The transflective liquid crystal display panel displays images without using a $\lambda/4$ phase delay sheet so as to realize a transflective liquid crystal display panel with simple structure. Furthermore, in embodiments of the present invention, polarizer sheets on both sides of the transflective liquid crystal display panel may have parallel transmission axes, which can realize normally black display, and in turn realize a normally black transflective liquid crystal display panel with simple structure. It is to be noted that depending on practical requirements, the angle between transmission axes of polarizer sheets on two sides of the transflective liquid crystal display panel in embodiments of the present invention may be otherwise set, therefore the transflective liquid crystal display panel is not limited to normally black mode.

Obviously, one skilled in the art can make various changes and variations to the present invention without departing from the spirit and scope of the present invention. Thus, if these changes and variations of the present invention fall within the scope of claims and equivalents of the present invention, it is intended that the present invention also include these changes and variations.

The present application claims priority of a Chinese patent application No. 201410030893.4 filed on Jan. 22, 2014, which is incorporated in its entirety herein by reference as part of the present application.

The invention claimed is:

1. A transflective liquid crystal display panel comprising: a first substrate and a second substrate disposed oppositely and a liquid crystal layer between the first substrate and the second substrate, wherein
    the first substrate and the second substrate include transmissive areas and reflective areas;
    transmissive areas of the first substrate are provided with a first homogenous alignment layer, transmissive areas of the second substrate are provided with a second homogenous alignment layer, and an alignment direction of the first homogenous alignment layer and an alignment direction of the second homogenous alignment layer have a predetermined angle; and
    reflective areas of the first substrate are provided with a third homogenous alignment layer and reflective areas of the second substrate are provided with a homeotropic alignment layer,
    the transflective liquid crystal display panel further comprising:
    a first polarizer sheet on the first substrate and a second polarizer sheet on the second substrate, wherein a transmission axis of the first polarizer sheet and a transmission axis of the second polarizer sheet form an angle of 0°~20°,
    wherein the alignment direction of the first homogenous alignment layer and the alignment direction of the second homogenous alignment layer form a predetermined angle of 70~90°, and
    wherein the alignment direction of the third homogenous alignment layer and the alignment direction of the first homogenous alignment layer are perpendicular to each other.

2. The transflective liquid crystal display panel of claim 1, wherein the transmission axis of the first polarizer sheet is parallel to the transmission axis of the second polarizer sheet.

3. The transflective liquid crystal display panel of claim 1, wherein the alignment direction of the first homogenous alignment layer and the alignment direction of the second homogenous alignment layer form an angle of 90°.

4. The transflective liquid crystal display panel of claim 1, wherein the first homogenous alignment layer, the second homogenous alignment layer, the third homogenous alignment layer and the homeotropic alignment layer comprise polyimide.

5. The transflective liquid crystal display panel of claim 1, further comprising: a reflective layer in the reflective areas on the second substrate, wherein the reflective layer is on a side of the homeotropic alignment layer opposite to the liquid crystal layer.

6. The transflective liquid crystal display panel of claim 5, wherein upper surfaces of the homeotropic alignment layer over the reflective layer and the second homogenous alignment layer disposed in the transmissive areas of the second substrate are on a same horizontal plane.

7. A display device comprising the transflective liquid crystal display panel of claim 1.

8. A manufacturing method of a transflective liquid crystal display panel, comprising:
    forming a first homogenous alignment layer in transmissive areas of a first substrate and forming a third homogenous alignment layer in reflective areas of the first substrate;
    forming a homeotropic alignment layer in reflective areas of the second substrate disposed oppositely to the first substrate, and forming a second homogenous alignment layer with an alignment direction forming a predetermined angle with an alignment direction of the first homogenous alignment layer in transmissive areas of the second substrate; and
    providing a liquid crystal layer between the first substrate formed with the first homogenous alignment layer and the third homogenous alignment layer and the second substrate formed with the second homogenous alignment layer and the homeotropic alignment layer,
    the manufacturing method further comprising:
    forming a first polarizer sheet on a side of the first substrate apart from the liquid crystal layer, and forming a second polarizer sheet with a transmission axis forming an angle of 0°~20° with a transmission axis of the first polarizer sheet on a side of the second substrate apart from the liquid crystal layer,
- wherein a layer of light polymerizable homogenous alignment solution is coated on the second substrate and the light polymerizable homogenous alignment solution is exposed to form the second homogenous alignment layer with an alignment direction forming an angle of 70~90° with an alignment direction of the first homogenous alignment layer; and
- wherein forming the first homogenous alignment layer in transmissive areas of the first substrate and forming the third homogenous alignment layer with the alignment direction perpendicular to that of the first homogenous alignment layer in reflective areas of the first substrate.

9. The manufacturing method of claim 8, further comprising before forming the homeotropic alignment layer on the second substrate:
- forming a reflective layer covering the reflective areas on a side of the second substrate close to the first substrate.

10. The manufacturing method of claim 8, wherein forming the second polarizer sheet with the transmission axis parallel to that of the first polarizer sheet on the side of the second substrate apart from the liquid crystal layer.

11. The manufacturing method of claim 8, wherein a layer of light polymerizable homogenous alignment solution is coated on the first substrate, the light polymerizable homogenous alignment solution corresponding to the transmissive areas is masked with a mask, and the light polymerizable homogenous alignment solution corresponding to reflective areas is exposed to form the third homogenous alignment layer; and
- the third homogenous alignment layer formed in the reflective areas is masked by a mask to expose the light polymerizable homogenous alignment solution corresponding to the transmissive areas to form the first homogenous alignment layer.

12. The manufacturing method of claim 8, wherein
- the second homogenous alignment layer formed in the transmissive areas is masked by a mask, a layer of light polymerizable homeotropic alignment solution is formed on the second homogenous alignment layer of the reflective areas, and the light polymerizable homeotropic alignment solution is exposed to form the homeotropic alignment layer.

13. The manufacturing method of claim 12, further comprising, after forming the second homogenous alignment layer: subjecting the second homogenous alignment layer to interface treatment with oxygen plasma.

\* \* \* \* \*